United States Patent [19]

Bates

[11] 4,117,526
[45] Sep. 26, 1978

[54] UNDERVOLTAGE PROTECTION DEVICE

[75] Inventor: James T. Bates, Elgin, Ill.

[73] Assignee: Tri-Venture, Lake in the Hill, Ill.

[21] Appl. No.: 808,730

[22] Filed: Jun. 22, 1977

Related U.S. Application Data

[63] Continuation-in-part of Ser. No. 712,380, Aug. 6, 1976, abandoned.

[51] Int. Cl.² .............................................. H02H 3/24
[52] U.S. Cl. ...................................... 361/92; 340/663
[58] Field of Search .................... 361/90, 92, 91, 187, 361/205; 340/248 B; 324/133; 307/130, 140, 363

[56] References Cited

U.S. PATENT DOCUMENTS

| | | | |
|---|---|---|---|
| 3,518,544 | 6/1970 | Tachick | 324/133 X |
| 3,718,839 | 2/1973 | Conti et al. | 361/92 |
| 4,024,438 | 5/1977 | Priegnitz | 361/92 |

Primary Examiner—Harry E. Moose, Jr.

[57] ABSTRACT

A circuit for protecting electrical apparatus from undervoltage of a source voltage by providing disconnection of the apparatus from the same. The circuit includes a relay controlled by a transistorized portion of the circuit responsive to conduction of a gas-discharge tube having specific breakdown and extinguishing voltage characteristics. The tube senses a voltage of that portion of the circuit having selectively adjustable A.C. and D.C. components proportionate to the source voltage, wherein a plurality of source voltage differentials can be selectively chosen at which connection and disconnection of the apparatus will be effected. The relay is also coupled to a capacitor to provide a time delay to prevent relay operation upon momentary voltage fluctuations.

14 Claims, 1 Drawing Figure

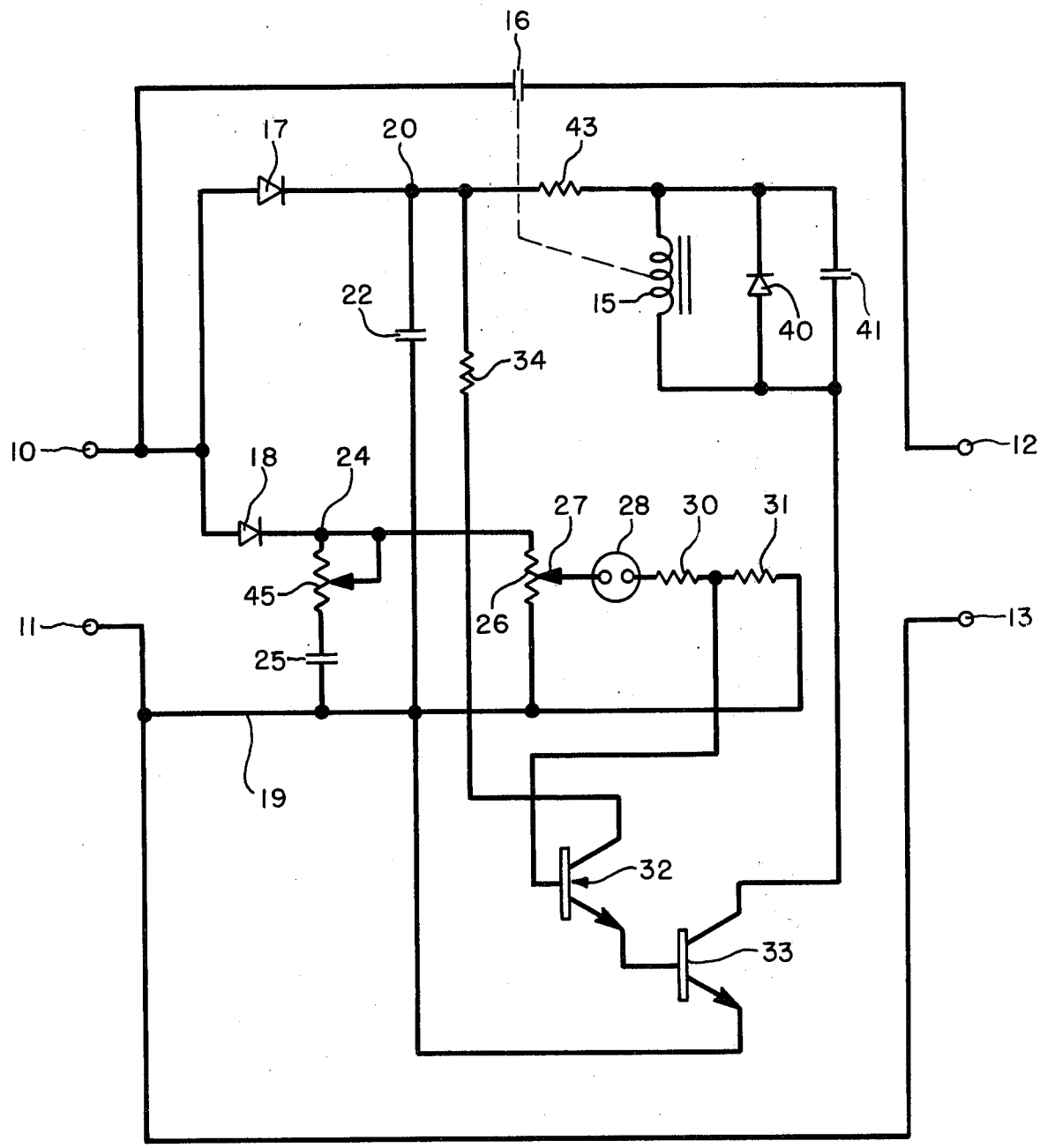

UNDERVOLTAGE PROTECTION DEVICE

This application is a continuation-in-part of my application Ser. No. 712,380 filed Aug. 6, 1976, now abandoned.

BACKGROUND OF THE INVENTION

The instant invention relates to the protection of electrical apparatus, such as refrigeration compressors, from power source undervoltage conditions, often referred to as brown-outs. Manufacturers usually provide thermal protection devices as part of their equipment; however, these are often inadequate during brown-out conditions especially where voltages may fluctuate in the brown-out range. Single-phase motors are particularly susceptible to damage because of high current draws in their starting windings which are usually disconnected from the line via centrifical switches. It has been found that in many situations factory installed thermal protection devices will not prevent permanent motor damage upon frequent start cycling at below normal line voltages.

Heretofore, some undervoltage devices provide protection by merely assuring time delay by way of timers or thermal devices upon sensing an undervoltage condition. Other such devices, relative to the instant invention, are complex in their circuitory and comprise considerable more expense in components and manufacture.

A primary object of the invention is to provide a device which is operative to disconnect an electrical apparatus from a voltage source upon sensing an occurrence of a preselected undervoltage condition of the source.

Another object of the invention is to provide that the device be adjustable to a selected undervoltage condition.

A still further object of the invention is to provide that the device operates between an adjustable preselected source voltage differential.

A still other object of the invention is to provide a time delay to prevent the device from actuating upon momentary source voltage drops to the selected undervoltage condition.

Still another object of the invention is to provide visual indicia to indicate the device operative.

A still further object of the invention is to provide that upon return of acceptable source voltage the device be operative to reconnect the apparatus to the voltage source.

Generally, the present invention comprehends a device to protect electrical apparatus subject to damage from undervoltage line or source conditions. The device includes a relay which may be coupled serially between the line and the apparatus or may function as a pilot relay for disconnecting the apparatus through, such as, a magnetic starter. The device has separate rectifying circuits which are coupled to the line or source voltage to provide a rectified source voltage reference. One of the rectified source voltage circuits is coupled to a gas-discharges tube through a variable resistor. This circuit also includes a potentiometer which provides a ripple factor or A.C. component to the rectified source voltage of this circuit. This circuit can be adjusted to select a plurality of voltage differentials proportionate to the source voltage at which the tube will fire and extinguish. The gas-discharge tube having specific breakdown and extinguishing voltage characteristics is coupled to control a pair of transistors connected in compound relation. The coil of the relay is coupled to one of the transistors. The other rectified source voltage drives the collector-emitter circuits and the coil. The coil is coupled, in parallel relation, with a diode and capacitor which provides a clamp across the coil. The capacitor also provides a time delay of relay acutation independent of the gas-discharge tube.

Other objects and features of the invention will be apparent from the following description and accompanying drawing which forms a part of this specification.

BRIEF DESCRIPTION OF THE DRAWING

The drawing is a schematic diagram of the electrical device which sets forth the invention.

DESCRIPTION OF THE PREFERRED EMBODIMENT

Referring to the drawing, the instant invention input terminals 10, 11 and output terminals 12, 13, it is contemplated that the input and output terminals may include connectors (not shown) which may readily adapt the device comprising the instant invention to various electrical apparatus for convenient connection.

The device comprises a relay having a coil 15 and a normally open contact 16 actuated thereby. It is understood that the relay may be double or multi pole type rather than a single pole as shown. The terminal 10 is coupled to one side of the contact 16 and to the anode terminals of rectifiers 17 and 18. Terminal 11 connects to a common conductor 19 and to terminal 13.

At a point 20, a capacitor 22 is connected between the cathode terminal of rectifier 17 and the common conductor 19, thus providing half wave rectification of the source voltage at the point 20. The capacitor 22 provides a shunt-capacitor filter at this point 20.

At point 24 a capacitor 25 and the fixed resistive portion of a potentiometer 45 are serially connected and coupled between the cathode terminal of rectifier 18 and the common conductor 19. The capacitor 25 provides a shunt-capacitor filter at this point. However, the wiper arm of the potentiometer 45 is coupled to point 24 to serve as a trimmer in order that an A.C. component of adjustable magnitude may be added to the rectified D.C. source voltage at that point. The fixed resistive portion of a potentiometer 26 is also connected between point 24 and common conductor 19. Serially connected potentiometer 45 and capacitor 25 are coupled in paralled relation with the potentiometer 26. The potentiometer 26 includes a wiper arm 27 which is coupled to a anode terminal of a gas-discharge tube such as a neon tube 28. Serially connected resistors 30 and 31 are connected between a cathode terminal of the tube 28 and the common conductor 19.

The circuit also comprises transistors 32 and 33 coupled in compound relation wherein the emitter terminal of transistor 32 is coupled directly to the base of transistor 33. The base of transistor 32 is connected between the serially connected resistors 30, 31. The collector of transistor 32 is connected to point 20 through a current limiting resistor 34. The emitter of transistor 33 is connected to common conductor 19.

The coil of the relay is connected in parallel relation with a diode 40 and a capacitor 41. It can be seen in the Drawing that one side of this parallel connection is coupled to point 20 through a current limiting resistor 43. The other side of this parallel connection is coupled to the collector of transistor 33. The diode 40 serves as a clamp to shunt any voltage spike which could occur at the collector of transistor 33 due to the collapsing of the magnetic field of coil 15. Capacitor 41 also provides a dampening effect but also serves to provide a time delay explained further hereinbelow. It can be appreciated the circuit components are minimal in number and relatively inexpensive.

OPERATION OF THE INVENTION

In operation the terminal 10, 11 are connected to a power source. The terminal 12, 13 are connected either to the electrical apparatus directly or to an auxiliary device, such as a magnetic motor starter, which in turn will operate to connect and disconnect the apparatus to be protected. Assuming normal source voltage, a rectified source voltage of substantially the same magnitude will exist at points 20 and 24. The rectified source voltage together with an A.C. component of adjustable magnitude at point 24 will be impressed across the fixed resistive portion of potentiometer 26. The wiper arm 27 of the potentiometer 26 will impress a rectified voltage less than that at point 24 on the anode of the tube 28 depending on the setting of the wiper arm 27. The tube 28 has specific voltages at which it will breakdown and conduct and extinguish and cease to conduct. The differential between these voltages varies in magnitude depending upon the design characteristics of the tube. Also tubes of same type may vary with regard to their operational voltage values. It is contemplated that gas-discharge tube of various types and design characteristics, such as radioactive elements and different breaddown and extinguishing voltages, can be employed in the circuit to provide a family of undervoltage protection devices to fulfill substantially any need.

At point 24 the potentiometer 45 can be adjusted to provide an A.C. component to the recitified source voltage or D.C. component at that point. The wiper arm 27 of potentiometer 26 will be set such that when the source voltage is normal a voltage proportional to the total magnitude of the D.C. and A.C. component at point 24 will be effective to cause the tube to conduct. It can be appreciated that for a tube having a particular fixed voltage differential effecting conduction and non-conduction thereof, the circuit can be adjusted such that essentially an infinite number of source voltage differentials i.e. from normal source voltage to a source voltage below that normal can be selected to operate the circuit as a whole. This is accomplished by the ability to selectively and separately adjust magnitudes of the D.C. and A.C. voltage components at point 24 to proportional voltages at the anode terminal of the tube by way of potentiometer 26. The potentiometer 26 effectively sets that proportional D.C. component which will cause the tube to extinguish. The potentiometers 45 and 26 together provide that magnitude of A.C. and D.C. component respectively such that a composite voltage thereof will cause the tube to conduct. The D.C. component at the tube's anode can be selected at any valve above the tube's extinguishing voltage. The A.C. component then can be adjusted to provide a total peak voltage which will cause the tube to conduct at normal source voltage. As the source voltage drops below normal, the D.C. component at the tube's anode, which is proportional to the source voltage, falls below the extinguishing voltage of the tube and the tube ceases to conduct.

At normal source voltage tube 28 conducts and the rectified voltage at point 20 allows transistor 32 to conduct which turns on transistor 33 causing the relay to pull because of coil's 15 connection thereto. Contact 16 closes and the apparatus connected to terminals 12, 13 is on the line.

Upon a drop in source voltage the D.C. component voltage at the wiper arm 27 will drop in proportion. When the source voltage drops such that the D.C. component at the anode of tube can no longer sustain conduction, conduction therethrough ceases, which interrupts the base current to transistor 32. Both transistors 32 and 33 immediately cease to conduct. It should be noted that this portion of the circuit is sensitive to sensing a substantially specific pre-selected abnormally low source voltage, for upon reaching such a voltage the tube 28 will respond almost immediately because the R-C time delay of capacitor 25 and the fixed resistive portion of potentiometer 26 is very short. However, at the time transistor 32 and 33 turn off the relay will not immediately drop out. The capacitor 41 has capacitance of such a magnitude as to maintain the coil 15 in an energized condition for several seconds. This will prevent the device from cycling during a momentary source voltage drop. It also can be appreciated that upon delay of capacitor 41 below the voltage to effectively drop the relay out and open contact 16 a momentary return of source voltage will not cause the relay to pull in because the capacitor must charge through resistor 43. Therefore, there is a time delay before the voltage across coil 15 will reach relay pick up voltage, even though transistors 32 and 33 are in a conduction mode, for the conduction mode of the transistors 32, 33 will precede relay pulling. Also the non-conduction mode of the transistor 32, 33 will precede relay drop out. Furthermore, upon return to normal or acceptable source voltage the invention as described will automatically return the apparatus in connection with the source voltage.

It is also contemplated that the instant invention would be enclosed in a housing (not shown) and that the neon tube could also provide visual indicia outside of said housing of whether the device is operative besides providing specific voltage parameters for the circuit together with contactless control mode with the advantage of the circuit being voltage and not current sensitive. It is also pointed out that the wiper arm 27 of the potentiometer 26 and the wiper arm of potentiometer 45 could be controlled externally of said housing for testing the circuit after installation and selecting that voltage in the field, which will most adequately protect the apparatus which is to protect. Furthermore, the potentiometers 26 and 45 allows the device to be precisely set during manufacture thereof for a specific undervoltage condition and variances in tube types and tube and circuit component characteristics due to inherent tolerance differences of these components.

The dual source rectification of the instant invention provides that the portion of circuit employing the potentiometer 26 and the gas-discharge tube 28 will remain accurately responsive to the preselected undervoltage condition. This circuit feature, however, also assures the elimination of circuit oscillation and attendant relay chatter.

It is further comprehended that even though a neon tube is described above, gas-discharge tubes of various varieties, designs and characteristics can be employed to effect undervoltage protection within the spirit and scope of the instant invention, for gas-discharge tubes are substantially unaffected by temperature and humidity. Tubes designed with radio-active elements incorporated therein can be used to assure stable characteristics thereof during exposure to an extremely wide range of electro-magnetic radiation.

It is also contemplated that the instant invention could be employed in hospitals, computer installations and the like as a device that could sense abnormally low voltages to effect accurate and immediate transfer of source power to emergency power systems. In such a use the relay described herein would probably be coupled to and operate a transfer system.

While the preferred embodiment has been described, it is to be understood that the instant invention is not limited thereto since it may be otherwise embodied within the scope of the following claims and is capable of many modifications.

What is claimed is:

1. A voltage sensitive under voltage protection device for coupling to a source and a load comprising:

sensing means having an input and output, said means operative to sense voltage magnitudes of said source at the input thereof and producing voltages at the output thereof having magnitudes proportional to said source voltage magnitude;

switching means operative to couple and de-couple said source from said load;

voltage reference means responsive to said sensing means for operating said switching means, said reference means having preselected and substantially specific conduction and non-conduction voltage characteristics substantially unaffected over a wide range of ambient temperatures and responsive to the voltage magnitudes of the output of said sensing means such that source voltage magnitudes greater and less than a predetermined level operate said switching means upon conduction and non-conduction of said referenced means; and said sensing means including means to selectively produce a plurality of separately adjustable direct and alternating voltage components effecting a plurality of composite direct and alternating voltage magnitudes at the output thereof which are proportional to said source voltage magnitude.

2. The invention according to claim 1 wherein said switching includes time delay means operative to delay operation of said switching means prior and subsequent to conduction and non-conduction of said voltage reference means.

3. The invention according to claim 2 wherein said voltage reference means comprises a gas-discharge tube having specific break-down and extinguishing voltage characteristics.

4. The invention according to claim 3 wherein said sensing means includes first and second variable impedance elements each having a fixed impedance portion and a first rectifying circuit for coupling to said source, said first variable impedance element coupled to said rectifying circuit and operative to produce said alternating voltage component of adjustable magnitude, said second variable impedance element coupled to said rectifying circuit and operative to produce said direct voltage component of adjustable magnitude, said second variable impedance coupled to said gas-discharge tube to conduct thereto said composite direct and alternating voltage magnitudes.

5. The invention according to claim 4 wherein switching means comprising a relay having a coil, said time delay means comprising a reactive element coupled to said coil, a second rectifying circuit for coupling to said source, and a current limiting impedance coupled to said second rectifying circuit and said reactive element.

6. The invention as recited in claim 5 wherein said switching means includes a pair of transistors coupled in compound relation, said transistors responsive to the break-down and extinguishing characteristics of said gas-discharge tube to effect pull-in and drop out of said relay by energization and de-energization of the coil thereof.

7. The invention as recited in claim 6 wherein the voltage reference means includes a plurality of resistors serially connected to said gas-discharge tube and coupled to at least one of said transistors, said resistors providing to limit current flow through said tube while effective to control conduction modes of said transistors.

8. A voltage sensing undervoltage protection device comprising:

a first and second rectifying system for coupling to a source voltage and producing a rectified source voltage therefrom;

switching means operative for connecting and disconnecting a load;

voltage reference means coupled to said first rectifying system and including means for selectively detecting voltage magnitudes proportional to said rectified source voltage; said reference means having substantially specific conduction and non-conduction voltage characteristics substantially unaffected over a wide range of ambient temperatures and operatively coupled to said switching means to operate the same upon conduction and non-conduction of said reference means in response to preselected rectified voltage source magnitudes;

time delay means coupled to said second rectifying system and said switching means, said time delay means effective to delay operation of said switching means before and after respective conduction and non-conduction of said reference means; and said means for selectively detecting voltage magnitudes comprising adjustable means coupled to said gas-discharge tube to selectively produce a plurality of separately adjustable direct and alternating voltage components producing a plurality of composite direct and alternating voltage magnitudes proportional to said source voltage to effect the conduction and non-conduction of said tube.

9. The invention according to claim 8 wherein said voltage reference means comprises a gas-discharge tube having specific conduction and non-conduction voltage characteristics.

10. The invention according to claim 8 wherein said adjustable means comprise first and second variable impedance elements, said first variable impedance element effective to produce said alternating voltage component, and said second variable impedance element effective to produce said direct voltage component.

11. The invention according to claim 9 wherein said gas-discharge tube includes a radio-active element which effectively maintains said voltage characteristics thereof stable over a wide frequency range of electromagnetic radiation upon exposure of said tube thereto.

12. The invention according to claim 10 wherein said switching means comprises a relay having a coil and a pair of transistors coupled in compound relation connected in operative relation to said coil, and said time delay means comprises a reactive element coupled to said coil and a current limiting impedance coupled to said second rectifying system and said coil and reactive element.

13. The invention according to claim 12 wherein said device includes a housing enclosing said device and said gas-discharge tube providing visual indicia of operation of said device external of said housing, and said first and second variable impedance means providing for selectively predetermining said direct and alternating voltage components proportional to said source voltage external of said housing.

14. The invention according to claim 13 wherein said reactive element comprises a capacitor coupled in parallel relation to said coil, and said current limiting impedance comprises a resistor serially connected between said second rectifying system and said parallel connection of said coil and capacitor.

* * * * *